United States Patent [19]

Bosnjak

[11] Patent Number: 4,544,487

[45] Date of Patent: Oct. 1, 1985

[54] CLARIFIER/THICKENER

[76] Inventor: Milovan A. Bosnjak, 8318-A Greenslope, Austin, Tex. 78759

[21] Appl. No.: 439,838

[22] Filed: Nov. 8, 1982

[51] Int. Cl.$^4$ .............................................. B01D 21/10
[52] U.S. Cl. .................................................... 210/522
[58] Field of Search ................. 210/521, 522, 802, 803

[56] References Cited

U.S. PATENT DOCUMENTS

| | | | |
|---|---|---|---|
| 3,687,298 | 8/1972 | Rozkydalek | 210/522 X |
| 3,754,656 | 8/1973 | Horiguchi et al. | 210/521 X |
| 4,151,084 | 4/1979 | Probstein et al. | 210/522 X |
| 4,396,508 | 8/1983 | Broughton | 210/522 X |
| 4,477,344 | 10/1984 | Olszewski et al. | 210/521 X |

Primary Examiner—Thomas Wyse
Attorney, Agent, or Firm—Trask & Britt

[57] ABSTRACT

The separation compartments of a clarifier are structured to force substantially all of a suspension through an active separating zone in a direct flow path which avoids short circuiting.

19 Claims, 10 Drawing Figures

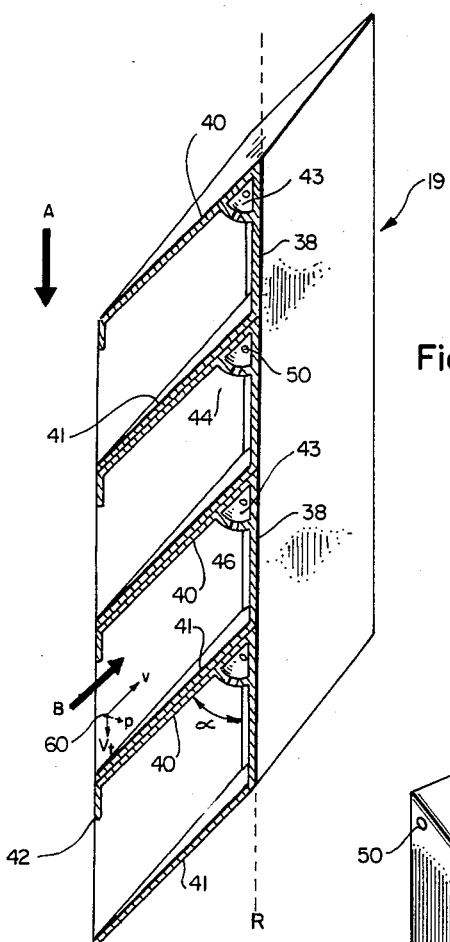
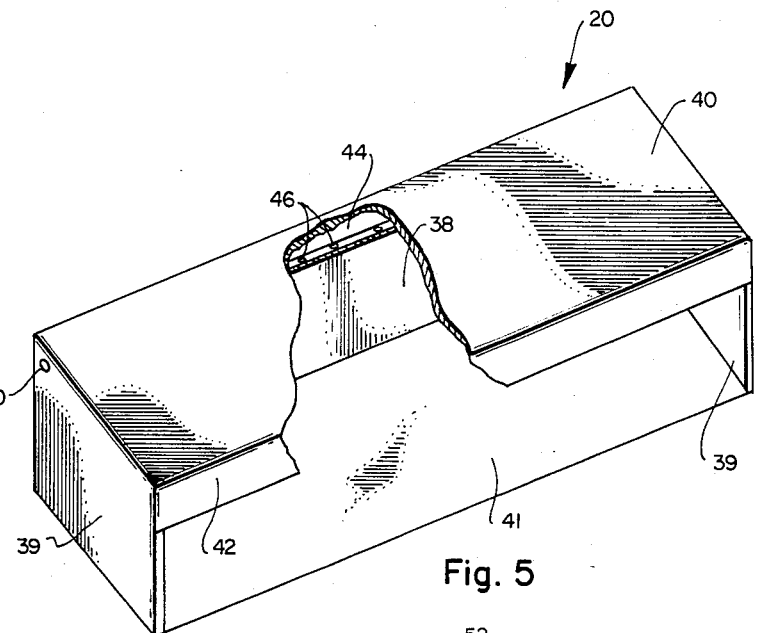
Fig. 4
Fig. 5
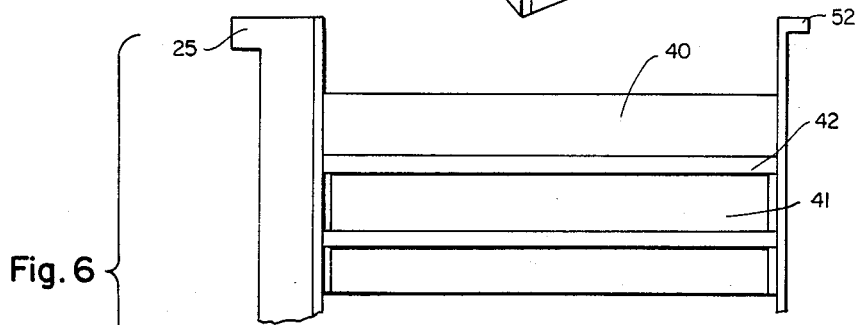
Fig. 6A
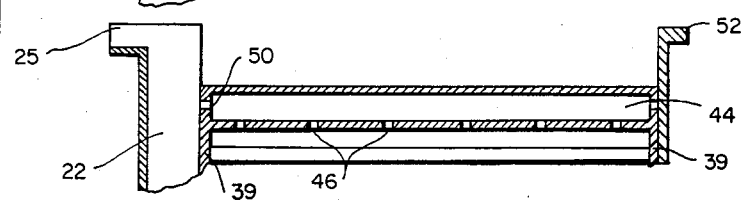
Fig. 6B
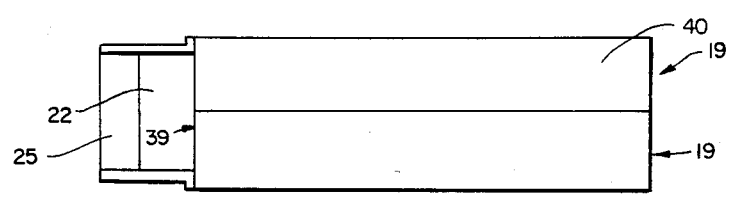
Fig. 6C
Fig. 6

CLARIFIER/THICKENER

BACKGROUND OF THE INVENTION

1. Field

This invention relates to methods and apparatus for separating suspended settleable and flotable substances (and immiscible liquids) from carrier liquids. More particularly, this invention is directed to improved apparatus of the gravity separation type.

2. State of the Art

U.S. Pat. No. 3,951,818 discloses apparatus of the type known as a "chevron clarifier" because of the characteristic configuration of its interior components. The chevron clarifier operates on the gravity separation principle. A plurality of separation elements (each comprising a stacked array of individual settling compartments) are suspended within a tank in approximately vertical parallel arrangement. The separation elements are paired to form a collection channel between each such pair. Each settling compartment is formed by spaced plates which are connected by an approximately vertical back plate to form an apex disposed approximately horizontally across the tank. The apex includes a predetermined number of calibrated separation apertures through the back plates. These apertures serve to evenly distribute the flow across the apex and to regulate the amount of liquid passing from the individual compartments into the collection channel. This arrangement, although simple and effective, has certain disadvantages.

The separation efficiency of the chevron clarifier is low when it is applied to the handling of material having a low concentration of suspended solids. In some instances, the feed mixture, or suspension, is unevenly distributed in the vertical direction as it enters the separation elements, thereby causing local overloading and decreased throughput.

The space requirements of the prior art chevron clarifiers are influenced adversely by the existence of the large vertical collecting channels extending between the paired separation elements.

The settling compartments used heretofore have been open at each side to the tank interior. This construction has permitted a surprising amount of short circuiting, resulting in decreased separation efficiencies, especially in the processing of low solids suspensions. Moreover, shortcircuiting imposes a practical upper limit on the concentration level obtainable.

Prior art chevron clarifiers constructed for a particular application cannot ordinarily be used for another application involving different settling and other characteristics. The separation apertures have not been readily accessible for cleaning and maintenance, making it necessary to take the clarifier out of service for such operations.

There remains a need for an improved apparatus which can perform the functions of a chevron clarifier while avoiding the problems of the prior art.

In addition to the chevron clarifier described, other pertinent prior art includes U.S. Pat. Nos. 349,990; 653,012; 1,190,863; 2,000,606; 2,314,977; 3,718,257; 3,727,770; and 4,056,477; all of which disclose various clarifier and/or thickener devices and methods. The "PURI-STAT" clarifier/thickener, a chevron-type device, is described in an undated brochure published by Puri-Stat Incorporated, 720 South Colorado Boulevard, Denver, Colo., 80222. The Graver Floc Barrier is described in Bulletin WC-146 published by Graver Water Conditioning Co., U.S. Highway 22, Union, N.J., 07083. Various gravity settler/thickener systems based upon the Lamella principle are described in Bulletin LT-103 published by Parkson Corporation, 5601 N.E. 14th Avenue, Fort Lauderdale, Fla., 33307.

SUMMARY OF THE INVENTION

The present invention provides an improved gravity separation apparatus capable of functioning as a clarifier and/or thickener. The claimed device may be operated to achieve effective gravity separation of suspended substances with greater efficiency of separation and better flow regulation than has been available with prior art chevron clarifiers. A much greater portion of the device may be devoted to active separation, because the large collection channel characteristic of the prior art is unnecessary. The claimed device further provides an improved thickening (concentration) ratio, while lending itself to easier and faster cleaning, maintenance and manufacture.

The aforementioned advantages may be achieved by making certain structural modifications to the classic chevron clarifier, in particular to the internal structures which control the flow path of the feed material, meter flow, regulate separation, and collect clarified liquid. According to this invention, the separation elements are constructed to direct substantially all of the carrier liquid through an active separation zone in a direct flow path. That is, the flow path is restricted to avoid short circuiting of the suspension. The cross-sectional area of the entryway to a compartment is desirably less than the cross-sectional area of the interior of the chamber parallel the entryway. Internal conduit means within the compartments are preferred to transfer clarified liquid rather than the large common vertical collecting channels of the prior art. While the prior art chevron clarifiers relied upon separation apertures to control the flow rate of clarified liquid, the preferred embodiments of the present invention control this flow rate by means remote from the apertures, ideally remote from the individual compartments of the separation elements. An orifice (which may be fixed, variable or interchangeable), operably associated with the aforementioned internal conduit means is an exemplary such flow control means. The thickening ratio of the claimed apparatus is enhanced by the absence of short-circuitry, and may be further enhanced by the provision of internal gravity operated recirculation means for recirculating separated solids.

The process effected by the apparatus of this invention involves the separating of a substance from a carrier liquid of different density. The separated substance may be either a solid or liquid and may be either heavier or lighter than the carrier liquid. This disclosure regards the carrier liquid as being clarified through operation of the process. While this disclosure emphasizes the separation of a relatively heavier particulate solid from a relatively lighter carrier liquid, it is not intended thereby to imply that the apparatus or process described are limited to this mode of operation.

The apparatus of this invention includes a vessel of the type typically found in a chevron clarifier. Thus, the vessel has a central zone arranged to receive a mixture of the substance and carrier liquid, with a first recovery zone positioned to receive the separated substance as it settles (either up or down) from the central zone, and a second recovery zone positioned to receive clarified liquid from the central zone. When the apparatus is used to separate a heavy solid, the first recovery zone will be beneath the central zone and the second recovery zone will ordinarily be above, and preferably isolated from, the central zone.

The central zone contains structure adapted to receive the mixture and direct its flow to outlet means communicating with the second recovery zone. This structure includes devices analogous to, but functionally distinct from, the separation elements of the prior art. Each such separation element comprises a stacked array of individual settling compartments, each of which includes an entry and an outlet. The chambers are structured to contain the mixture and direct it along a flow path between the entry and the outlet at a velocity having a vector component approximately opposite the natural settling direction of the substance it is desired to separate from the carrier liquid. In a typical instance, mixture is introduced to the central zone to move in a direction approximating the natural settling direction of the substances; e.g. vertically downward. Portions of the mixture are inevitably displaced into the entryways of the individual settling compartments. Under the flow conditions maintained within the central zone, each compartment contains the liquid portions of the mixture entering it and guides it to one or more outlets. Clarification is effected within the chambers through gravity separation because the velocity of flow through the chambers is too low to hold the substance in suspension. The substance thus settles back out through the chamber entry to join the mixture flowing downward to the first recovery zone. The cross-sectional area of each chamber normal the direction of flow between the entry and the outlet is approximately constant, at least for sufficient distance from the entry to effect the full settling separation available in the device.

The outlets of the chambers are in fluid communication with the second recovery zone, usually through a system of relatively low volume conduits. These conduits replace the large volume discharge channel relied upon by the prior art chevron clarifiers to transfer clarified liquid to the second recovery zone. Flow regulation is conveniently provided through flow restriction means associated with these conduits. (It is within contemplation that flow restriction be effected by such varied devices as orifi, or timed or variable flow regulation devices.) Thus, the flow rate required to assure that the aforementioned vector component of the velocity of the mixture within the settling compartments is less than the settling velocity of the substance may be selectively imposed on the system by providing appropriate flow restriction in the conduits transferring clarified liquid to the second recovery zone.

As portions of thickened mixture are removed from the first recovery zone and clarified liquid is removed from the second recovery zone, a compensating volume of feed mixture is introduced to the central zone to maintain a desired fluid level in the tank. The thickening ratio of the mixture treated by the process is increased by recycling a portion of the withdrawn thickened mixture back to the tank, preferably to the first recovery zone.

A restricted entrance to the separation compartments has a beneficial effect on the distribution pattern of the feed mixture within the compartments. The active separation time within the compartments is also increased by this means, thereby resulting in higher throughput and improved efficiency.

One of the important features of both the prior art chevron clarifier and the present invention is the maintenance of a uniform velocity and laminar flow of the mixture within the separation compartments. These conditions are assured by maintaining a generally rectangular shape of the compartments normal the flow path of the mixture. However, the cross-sectional area of the compartments may be permitted to progressively decrease starting at the region where settling is intended to be substantially completed. The portion of the compartment adjacent the entryway and in which settling occurs is regarded as "active". The portion of the compartment adjacent the apex and in which little or no settling occurs is regarded as "inactive". This inactive portion can be utilized as (or to accommodate as a separate element) an internal conduit to collect and transport clarified liquid. The quantity of clarified liquid extracted from each compartment, and consequently the liquid flow velocity through the compartments, can be regulated by placing a single flow regulation aperture (e.g., an orifice) within the inactive zone of each separation compartment.

To process suspensions exhibiting high separation rates it is usually preferrred to isolate the inactive zone from the active zone of the compartment. This isolation may be effected by placing an internal (usually horizontal) conduit within the inactive zone. Apertures are provided through the sidewall of the conduit to admit clarified liquid. Ideally, the apertures are located to assure uniform distribution and laminar flow across the width of the separation compartment. A flow regulator (usually an orifice) is provided in fluid flow communication between the interior of the conduit and the second recovery zone of the tank.

BRIEF DESCRIPTION OF THE DRAWINGS

In the accompanying drawings, which illustrate that which is presently regarded as the best mode for carrying out the invention.

FIG. 4 is a perspective view, partially in section, of a separation element of the type also visible in FIGS. 1 through 3;

FIG. 5 is a perspective view of one separation compartment shown in FIG. 4, with a portion broken away;

FIGS. 6A, B and C are, respectively, a side view, a view in cross-section and a top view of an assembly of separation compartments, internal conduits and vertical collector;

DETAILED DESCRIPTION OF THE ILLUSTRATED EMBODIMENT

Figure 1:
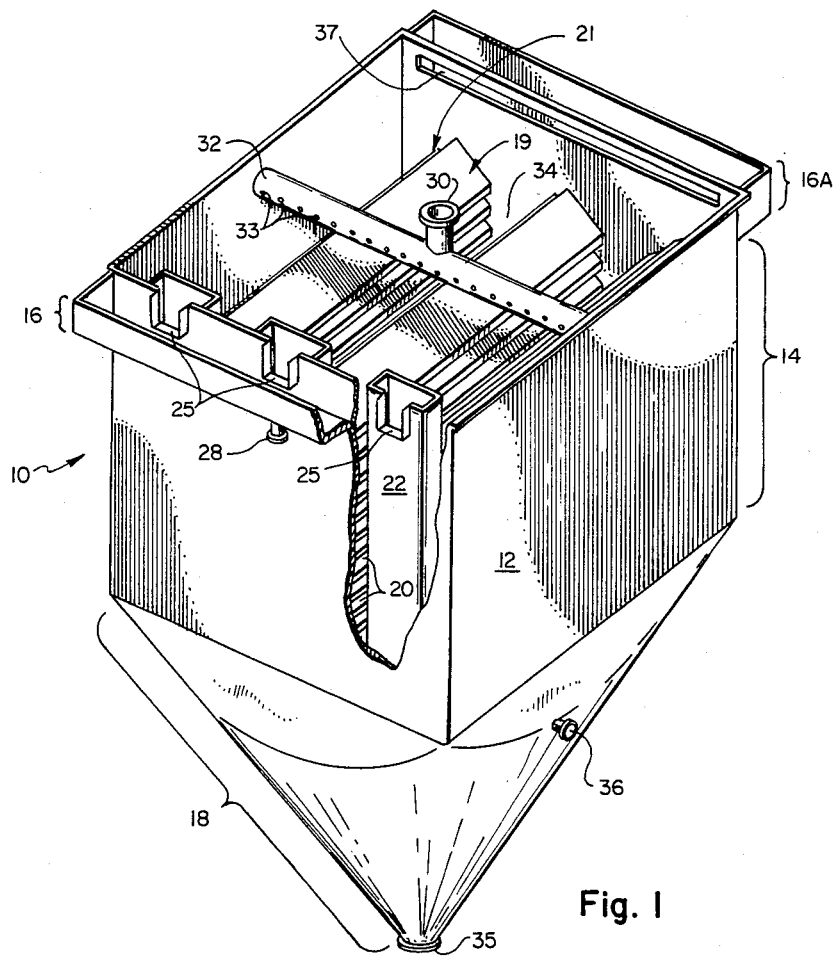
FIG. 1 is a perspective view of the clarifier of the present invention, partially broken away.
Figure 2:
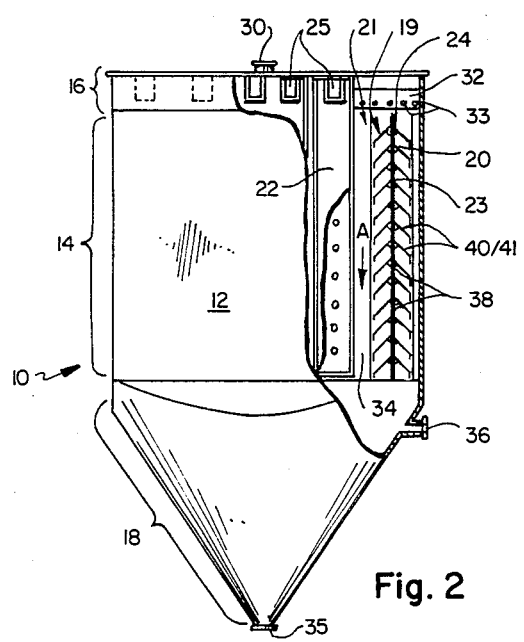
FIG. 2 is an end view of the clarifier of the present invention, also partially broken away.
Figure 3:
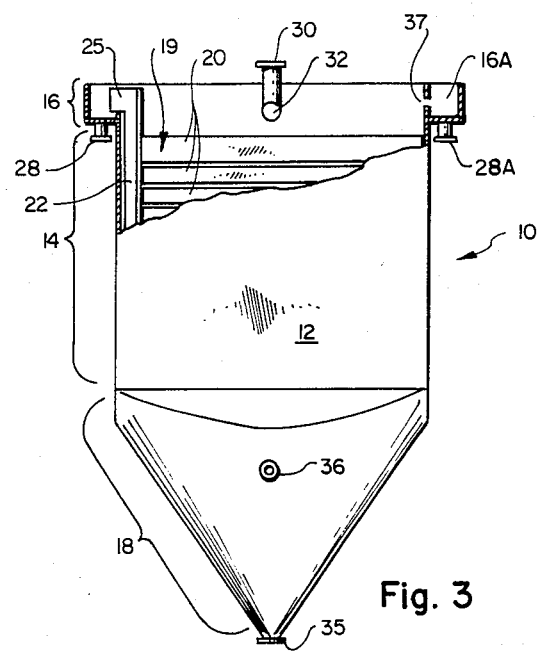
FIG. 3 is a side view of the clarifier of the present invention, also partially broken away.

Referring especially to FIGS. 1, 2 and 3, a clarifier of this invention, generally referenced as 10, is embodied for the separation of a substance of greater density from a carrier liquid of lesser density. The clarifier includes a tank 12 with a central zone (separation portion) 14, a recovery zone for clarified liquid (collector box) 16 located above the separation portion 14 and a recovery zone for a thickened mixture of the substance and carrier liquid (sump portion) 18 located below the separation portion 14. Within the interior of the tank 12 (in the separation portion 14) are suspended a plurality of separation elements 19. Each such element 19 includes a number of settling compartments, individually designated 20, and shown in the broken away portions of FIGS. 1, 2 and 3. The settling compartments 20 are arranged in the elements 19 shown as approxiately vertically stacked arrays within the separation portion 14. In the illustrated instance, pairs of separation elements 19 are associated in assemblies 21 (best shown by FIG. 7). Such an arrangement reduces the volume requirements of the tank 12 for a specified throughput.

Each separation element 19 is connected to at least one collector 22 through internal conduits 23 (FIG. 2).

Although the arrangement of compartments 20, internal conduits 23 and vertical collectors 22 will be described more fully in conjunction with subsequent figures, it should be generally understood that, as feed mixture is introduced to the tank 12, clarified liquid will flow upward in the settling compartments 20 to the apex 24 (FIG. 2) of each compartment. Clarified liquid is transported from the apexes 24 via suitable internal conduits 23 to the collector channels 22, eventually discharging over weirs 25 into the collector box 16 of the clarifier 10. As shown, the internal conduits 23 are approximately horizontal and the collector channels 22 are approximately vertical. Other arrangements can be utilized provided that clarified liquid is directed eventually to a recovery zone.

An inlet 30 is connected to a distribution pipe 32 which constitutes means for distributing the incoming feed suspension near the top of the separation portion 14 of the clarifier 10. In the illustrated instance, distribution apertures 33 in the distribution pipe 32 are positioned below the normal liquid level of the tank 12, and are positioned to distribute the incoming suspension evenly among the channels 34 between adjacent separation assemblies 21. From the upper portion of the clarifier 10, feed suspension flows downward between the assemblies 21. Each settling compartment 20 admits a portion of the mixture, and passes a corresponding portion of clarified liquid out of the separation portion 14 via the vertical collector 22 while the higher density substance moves continuously downward through the zone 14. The density of the suspension increases as it passes each horizontal row of settling compartments 20. A thickened mixture of the heavier substance and carrier liquid is collected in the sump portion 18. An outlet 35 at the bottom of the sump portion constitutes means for draining of the thickened mixture. A portion of the thickened mixture may be reintroduced back into the sump portion 18, preferably at a point just below the separation zone 14, such as through the inlet 36. A recycle of this type assures continuous movement of the heavier substance within the sump portion 18.

A collection box 16A is shown adapted to serve as a safety overflow or froth collector. A direct communication between the upper portion of the clarifier 10 and the box 16A is effected by means of overflow openings 37.

Referring specifically to FIG. 2, two assemblies 21 of separation elements 19 are shown in the broken away portion. One is shown in cross-section taken through the middle of the assembly, and the other one is shown as an end view, partially broken away of the assembly 21 in association with a vertical collector channel 22 and overflow weir 25. The overflow weirs 25 extend into the collection box 16 of the clarifier 10. Clarified liquid is removed from the box 16 through the drain outlet 28.

The broken away portion of FIG. 3 illustrates the transverse extension of the settling compartments 20 across the separation portion 14 of the vessel 12. A stacked array of separation compartments is assembled as a self-supporting functional separation element 19 (FIG. 4) or assembly 21 (FIG. 7) removably retained within the tank 12 by appropriate supports.

FIGS. 4 and 5 illustrate one form of the separation compartments used in the present invention. FIG. 4 shows a single bank separation element 19 including four individual settling compartments 20 of the type shown by FIG. 5. Each compartment 20 includes a back plate 38, side plates 39, generally parallel top 40 and bottom 41 plates, and an inlet lip 42. Each of the plates 38, 39, 40, 41 and lip 42 are shown as generally rectangular members. The back plate 38 will normally be disposed generally vertically, and the bottom plates 41 are inclined at a predetermined angle $\alpha$, with respect to a vertical plane R. Thus disposed, the top plate 40 and back plate 38 inevitably define an apex 43 including the same angle $\alpha$. An internal conduit 44 is positioned within this apex 43. As best illustrated by FIG. 5, each conduit 44 is provided with a number of relatively large apertures 46 of a predetermined cross-sectional area sufficient to evenly distribute liquid flow along the width of the compartment 20. Regulation of the quantity of liquid to be extracted from each compartment 20 is accomplished by means of flow regulation orifices 50 positioned within the conduit 44 at one or both side plates 39 to allow clear liquid from within the conduit 44 (or the apex 43 in the absence of physical conduit structure) to exit the settling compartment 20. It should be noted that the internal conduits 44 are required for a limited number of applications only and in many instances may be omitted. The inactivity (with respect to settling) within the apex permits the apex zone 43 itself to function as a conduit means.

FIG. 6 illustrates the manner in which the separation elements 19 (or assemblies 21) are suspended within a tank 12 and interconnected through the internal conduits 44 with the vertical collectors 22. An entire stacked array of compartments 20 may be removably supported from the structures 52, 25. Each internal conduit 44 has at least one corresponding flow orifice 50 at the sidewall(s) 39 which constitutes the only flow path between the apex 43 and the vertical collector 22.

Figure 7:
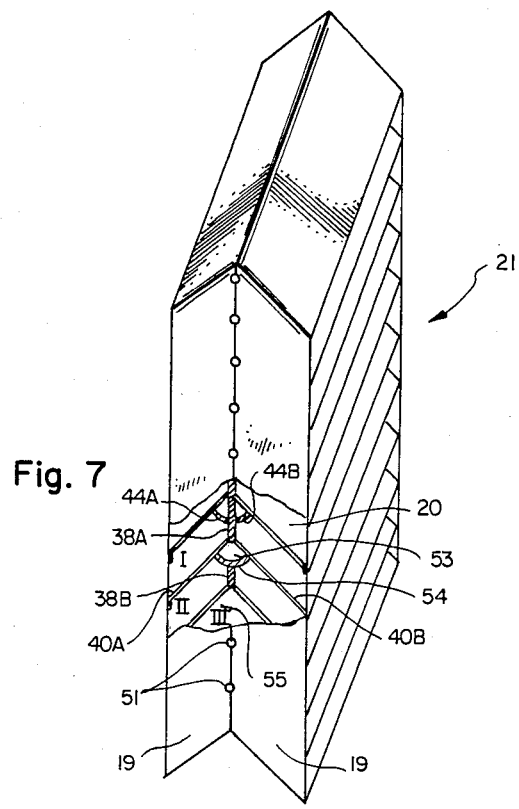
FIG. 7 is a perspective view of an alternative form of separation element.

An assembly 21 may be fashioned by placing two (2) settling elements 19 back-to-back as illustrated by FIG. 7. For purposes of illustration only, three alternative constructions, I, II and III, respectively, are shown in the brokenaway portion of the figure. Construction I places two (2) compartments 20 of the type illustrated by FIG. 5 back-to-back, utilizing a common back plate 38A. The apex of each compartment communicates through a separate orifice (not visible); e.g. through the conduits 44A, 44B. Construction II is similar, but the back plate 38B extends only partway up the back of the adjacent compartments 20 to the vicinity of the common apex 53 formed by the plates 40A and 40B. In the illustrated instance, the apex 53 is isolated within a conduit 54. A single orifice (not visible) may then be utilized to provide fluid communication between the apex 53 and a collector channel 22. Construction III eliminates the back plate and conduit structures entirely. Under carefully controlled flow conditions, the apex 55 will function as a common inactive region. A fluid flow barrier somewhat analogous to a physical back plate is provided by the opposing flows at the vicinity of the apex 55. Clarified liquid may be withdrawn through an orifice (not visible) as in the case of Construction II.

As an example of operation of the clarifier 10, a mixture of substance of greater density and a carrier liquid of lesser density is introduced through the inlet 30 and distribution pipe 32 (FIG. 1). The mixture is caused to flow downward between the vertical stacks of compartments 20 as illustrated by flow path A (FIG. 2). The mixture of the suspended substance and the carrier liquid is displaced by hydrostatic pressure upward through the separation compartments 20 and toward apex 43 following flow path B (FIG. 4). The particles of the heavier suspended substance, such as particle 60, will be influenced by gravitational force and by the dragging force of the moving liquid. They will thus move along the path P, the resultant of the liquid's upward velocity V and the settling velocity Vt. Both the settling velocity Vt and the up-flow liquid velocity V through the respective compartments 20 are of the same orders of magnitude.

By maintaining the liquid velocity V at a positive value within the range $V \leq Vt \cos \alpha$, it is assured that the particles 60 having settling velocity Vt or greater will be propelled upward along the bottom plate 41 a very limited distance. Few, if any, such particles 60 will be transported to the vertical collector 22.

the amount of laminar and steady flow of liquid through each individual compartment 20 may vary, depending upon each compartment's vertical position in the array. Internal flow conditions are affected by changes in density, changes of settling velocity Vt, and changes in hydrostatic pressure. Accordingly, it is often necessary or desirable to regulate separately the flow of liquid through each individual compartment so as to maintain approximately the relationship $V \leq Vt \cos \alpha$. It is usually preferred, of course, that V be controlled to approximate the upper limit of this range.

As the feed suspension flows downward following the flow path A, upward liquid flow through each of the compartments 20 is determined by the size of the flow regulation orifice 50 positioned at the sidewall 39. Liquid flows upward at the predetermined velocity V and is evenly distributed along the width of the compartments 20 due to the influence of specific gravity gradients, the inlet lip 42 and the apertures 46. While the liquid moves steadily at a uniform rate and very low velocity V through a compartment 20 towards its apex 43, the particles 60 of the suspended substance settle downward against the bottom plate 41 of the compartment 20. Clarified liquid enters the internal conduit 44 through the apertures 46 and is transported toward the vertical collector 22 through the flow regulation orifice 50. After passing through the orifice 50, clear liquid is transported via the vertical collector 22 and the weir overflow 25 into the collection box 16 for discharge through the drain outlet 28.

Further thickening of settled substance under the influence of gravity, externally introduced vibrations and by recirculation of settled solids is sometimes practiced. Settled solids are continuously discharged from the sump portion 18 through the outlet 35 generally using a positive displacement pump, not shown, located downstream of the outlet 35. A portion of discharged solids may be reintroduced back into the lower part of the sump portion 18 through one or more conveniently located inlets 36. Such continuous recirculation of solids within the sump portion 18 does not affect the clarification process which takes place within the separation portion 14 of the tank 12, but it does improve the thickening of solids. Circulation reduces the size of settled particles and frees entrapped liquid from the settled solids. The thickening effect of the internal recirculation contemplated by this invention is comparable to the effects produced by the use of moving internal mechanical parts, such as raking mechanisms or so-called "picket fence" mechanisms.

Figure 8:
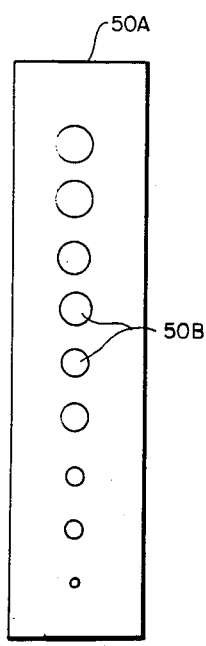
FIG. 8 is a side view of a detached orifice plate.

The present invention contemplates the provision of a new and improved arrangement for the regulation and distribution of liquid flow through the separation compartments 20. In the preferred embodiment, the apertures 46 are not relied upon to regulate liquid flow. When they are present, their function is to evenly receive flow along the width of the settling compartments 20. The apertures 46 are made large enough to prevent plugging and scaling over during the course of prolonged continuous operation. They may be all of the same size regardless of their vertical position in a stacked array of compartments 20. Any required pressure drop and regulation of the quantity of clear liquid extracted from each compartment 20, and consequently the regulation of liquid flow through the compartments 20 is effected by an orifice 50 at one or both ends of each of the internal conduits 44. All flow regulation orifices 50 for an entire separation element 19 can be connected to a common vertical collector 22 through an orifice plate 50A. As best seen from FIG. 8, the orifice plate 50A may provide for individual orifi 50B of varying size to compensate for gradients in hydrostatic pressure within the tank 12. Because the collector 22 is open above the liquid level, easy access is available to the flow regulation orifices 50. They can thus be cleaned during continuous operation of the clarifier 10. Moreover, in certain embodiments, individual orifices may be adjusted, replaced or interchanged, as needed, through this access.

EXAMPLE

An effective and economical embodiment of a separation element 19 for placement within a tank 12 may be constructed of individual compartments 20 within the following range of dimensions:

Horizontal projection of the top 40 and bottom 41 plates (with the element 19 held approximately vertical)—about 2 to about 4 inches normal the back plate 38.

Height of back plate 38—about 2 to about 4 inches.

Inclination of the compartment (bottom plate 41) from a horizontal plane—about 50° to about 70°.

Apex angle α—about 20° to about 40°.

Inlet lip 42—sufficient to effect a reduction of up to about one-fourth the cross-section area of the compartment 20 parallel the back plate 38.

The width of the compartments 20 may range from several inches to several feet. The elements 19 may vary from less than one to ten or more feet in height.

As previously noted, the separation elements 19 of this invention may be applied to the separation of floatable substances of two immiscible liquids. For such applications, the vertical orientation of the separation elements 19 is reversed within the separation portion 14 of the tank 12. The feed suspension is introduced from the bottom of the tank 12 through the element 35, which in this case functions as an inlet. The lighter liquid or the flotable substance floats upward to the top of the clarifier 10, and overflows through the openings 37 into the collection box 16A from which it is conveniently removed via outlet 28A. The clarified heavier liquid flows downward through the compartments 20 into the internal conduits 23 (FIG. 2), 44 (FIG. 4) from which it is transported to the vertical collector 22 and then discharged through the overflow weirs 25 into the collection box 16.

Reference herein to details of the illustrated embodiments is not intended to limit the scope of the appended claims, which themselves recite those features regarded as descriptive of the invention.

I claim:

1. In a clarifier of the type in which a stacked array of settling compartments is mounted substantially vertically within a vessel to provide exterior of said array along its entire vertical height within said vessel a flow stream of a mixture of a carrier liquid and suspended solids so that each said settling compartment receives a mixture of carrier liquid and suspended solids directly from said flow stream, the improvement comprising:

the individual settling compartments within said stacked array, each being defined by a back plate, opposing side plates, a top plate and a bottom plate, cooperatively assembled to receive the mixture directly from said flow stream through an entryway opposite said back plate, and to receive substantially all of said carrier liquid at said back plate under clarifying flow conditions so that solids settle towards said bottom plate and then pass outwardly through said entryway to join said flow stream; and means for withdrawing said clarified liquid from a zone adjacent said back plate at a controlled rate.

2. An improvement according to Claim 1 wherein said entryway is defined by the edges of said side plates and bottom plate and a lip plate opposite said back plate depending from said top plate across its width, thereby to provide an entry opening with a cross-sectional area less than that of the interior of the compartment parallel said entryway.

3. An improvement according to Claim 1 wherein said means for withdrawing said clarified liquid comprises an orifice on a side plate communicating with said zone.

4. An improvement according to Claim 3 including a conduit within said zone isolated from the interior of said compartment except for apertures through said conduit in communication with said zone exterior of said conduit, the interior of said conduit being in open communication with said orifice.

5. An improvement according to Claim 1 wherein said means for withdrawing said clarified liquid comprises flow control means associated with a side plate communicating with said zone.

6. An improvement according to Claim 5 wherein each said unitary compartment in said stacked array includes individual said flow control means, and each of said flow control means pass clarified liquid to a collection channel adjacent the side plate with which said flow control means is associated.

7. An improvement according to Claim 6 wherein the individual flow control means are selected to establish a desired flow rate within each of said compartments.

8. In a clarifier in which a stacked array of settling compartments is mounted substantially vertically within a tank so that there is provided a flow channel within said tank exterior of said stacked array along its entire vertical height, the improvement which comprises:

individual compartments defined by approximately parallel top and bottom plates mounted at an incline with respect to a horizontal plane and side plates connecting said top and bottom plates to provide an entry to receive a fluid mixture of settleable substance and carrier liquid from said flow channel, such that when said mixture is introduced to said entry under hydrostatic pressure conditions it is caused to flow in a path confined within said compartment towards a zone adjacent said top plate opposite said entry, said zone being provided with a flow control device constituting means for passing clarified liquid from said zone at a rate which maintains the flow rate of said mixture within said compartment effective to permit said substance to settle from said mixture and pass out of said compartment through said entry to said flow channel.

9. An improvement according to Claim 8 wherein said flow control devices comprise orifi in at least one sidewall of each compartment.

10. An improvement according to Claim 9 wherein the orifi associated with each compartment in a stacked array are selected to effect approximately identical flow rates within each compartment.

11. An improvement according to Claim 10 wherein said top and bottom plates are inclined from horizontal such that the entryway is at a lower elevation than said zone.

12. An improvement according to Claim 11 including a back plate connecting said top, bottom and side plates so that said zone is located adjacent the apex defined by said top and back plates.

13. An improvement according to Claim 12 including conduit means within said apex, said flow control device providing fluid flow communication between the interior of said conduit and the exterior of said apex and said conduit being provided with apertures to admit clarified liquid from said zone to the interior of said conduit.

14. A clarifier including:

a stacked array of settling compartments within a vessel, there being an inlet at the top of the vessel and an outlet at the bottom of the vessel so that there is defined a flow path between said inlet and outlet exterior of said stacked array;

each said compartment being configured to provide an entry in open communication with said flow path so that when said vessel is filled with a fluid mixture of a settleable substance and carrier liquid, said mixture is caused to flow by hydrostatic pressure through said entryway in an ascending inclined path confined within said compartment to a zone remote from said entry;

said zone including means for passing clarified liquid therefrom at a rate which maintains the flow rate of said mixture within said compartment effective to permit said substance to settle from said mixture and pass out of said compartment thorough said entry; thereby to exit said vessel through said outlet.

15. A clarifier according to Claim 14 wherein the individual compartments are defined by approximately parallel top and bottom plates mounted at an incline with respect to a horizontal plane and side plates connecting said top and bottom plates to define said entry, and said zone is adjacent said top plate opposite said entry.

16. A clarifier according to Claim 15 including a back plate connecting said top, bottom and side plates so that said zone is located adjacent the apex defined by said top and back plates.

17. A clarifier according to Claim 15 further including a lip plate opposite said back plate depending from said top plate across its width, thereby to provide an entry opening with a cross-sectional area less than that of the interior of the compartment parallel said entryway.

18. A clarifier according to Claim 15 wherein said means for passing clarified liquid comprises an orifice on a said side plate.

19. A clarifier according to Claim 18 including a conduit within said zone isolated from the interior of said compartment except for apertures through said conduit in communication with said zone exterior of said conduit, the interior of said conduit being in open communication with said orifice.

* * * * *